United States Patent [19]

Hund et al.

[11] 4,140,539
[45] Feb. 20, 1979

[54] HYDROTHERMAL PROCESS FOR PRODUCING DENSE IRON OXIDE PIGMENTS

[75] Inventors: Franz Hund; Gunter Buxbaum; Lutz Leitner, all of Krefeld; Ingo Pflugmacher, Meerbusch, all of Fed. Rep. of Germany

[73] Assignee: Bayer Aktiengesellschaft, Leverkusen, Fed. Rep. of Germany

[21] Appl. No.: 817,079

[22] Filed: Jul. 18, 1977

[30] Foreign Application Priority Data

Jul. 27, 1976 [DE] Fed. Rep. of Germany ....... 2633597

[51] Int. Cl.² .......................... C09C 1/24; C04B 35/26
[52] U.S. Cl. ................................ 106/304; 252/62.62; 252/62.56; 423/633; 106/308 C
[58] Field of Search ..................... 252/62.56; 423/633, 423/634; 106/308 C, 304

[56] References Cited

U.S. PATENT DOCUMENTS

| | | | |
|---|---|---|---|
| 3,557,266 | 1/1971 | Chiba et al. | 252/62.56 |
| 3,989,794 | 11/1976 | Berchtold | 252/62.56 |

*Primary Examiner*—Winston A. Douglas
*Assistant Examiner*—J. V. Howard
*Attorney, Agent, or Firm*—Sprung, Felfe, Horn, Lynch & Kramer

[57] ABSTRACT

An acicular to prismatic ferrimagnetic iron oxide pigment with a porosity of less than about 10% by volume, and optionally containing up to about 15% by weight of other metal oxides such as Zn or especially Co, are produced by heating a suspension of iron(III)oxide hydroxide in an autoclave to a temperature above about 100° C in the presence of at least one mono-, di- or tri-saccharide, at least one alkali metal or alkaline earth metal hydroxide or carbonate and excess water, and washing, filtering and drying the resulting pigments.

13 Claims, No Drawings

HYDROTHERMAL PROCESS FOR PRODUCING DENSE IRON OXIDE PIGMENTS

This invention relates to new acicular iron oxide pigments with improved magnetic and processing properties and to a process for producing these pigments by the hydrothermal conversion of iron(III)oxide hydroxides or carbonates in the form of aniosometric particles and optionally modified by the presence of foreign metal oxides or hydroxides.

The materials generally used in practice for the magnetic recording of sound, video and other signals are magnetic iron oxide based on $\gamma$-$Fe_2O_3$, $Fe_3O_4$ or isotype mixed phases of $\gamma$-$Fe_2O_3$ with $MeFe_2O_4$ where Me represents Mg, Mn, Fe, Co, Ni, Cu, Zn, Cd, Al, Ga, Sc, Cr, Ti, Sn, Ge, Li, Na, Ag, Mo and W. Iron oxide pigments in the context of the present invention are finely divided ferrimagnetic pigments consisting of the above-mentioned pure or mixed phases.

In order to use the above-mentioned iron oxide pigments for magnetic signal recording, the pigments are dispersed in suitable binders and the resulting dispersions are applied in a thin layer to a magnetic inert support, optionally with alignment by a strong magnetic field.

It is known that magnetic iron oxide pigments in aqueous solution can be precipitated with bases from a suitable salt solution and subsequently oxidized at temperatures below 100° C. It is also possible to reduce suitable oxide, oxide hydroxide, hydroxide or aquoxide compounds in the solid form either directly or after the thermal elimination of water at temperatures between 200° C. and 550° C. Reduction may be carried out with gaseous, liquid and/or solid substances. Before they are used, the magnetic pigments may subsequently be carefully oxidized by exposure to the controlled action of air or oxygen at temperatures of from 250° C. to 350° C. The particle sizes of the pigments used for magnetic recording vary from $0.05\mu$ to $2\mu$.

A major disadvantage of conventional iron oxide pigments for magnetic recording is the large pore volume of these particles which can amount to as much as 50% by volume. These large vacuoles in the surrounding ferrimagnetic matrix do not contribute towards magnetization.

Currently, acicular iron oxide pigments with a cubic spinel structure are predominantly used in practice by virtue of their better magnetic properties, more especially the coercive force and magnetic flux. They are generally produced by the process according to U.S. Pat. No. 2,694,656. In order to obtain the acicular form with a cubic spinel structure, the production process starts with the acicular to prismatic oxide hydroxides of iron crystallizing in the rhombic ($\alpha$-FeOOH, goethite; $\gamma$-FeOOH-lepidocrocite) or tetragonal ($\beta$-FeOOH, akaganeite) crystal system or its mixed-phase oxide hydroxides with the above-mentioned modifying elements, or the other hydroxides or carbonates are precipitated in small quantities onto the acicular oxide hydroxides of iron or its mixed phases, followed by reduction and oxidation, optionally after careful thermal dehydration under mild conditions to keep intact the external acicular form of the starting compounds. Accordingly, the conversion process has to be carried out as carefully as possible because the acicular form favorably affects numerous desirable magnetic properties, e.g. high orientability, high coercive force, low noise and increase in magnetic flux in the tape direction in magnetic recording. During this conversion of the oxide hydroxides of trivalent iron with elimination of water and retention of the external acicular form of the starting material (pseudomorphosis), in accordance with the empirical reaction equation:

$$2 \text{ FeOOH} \rightleftharpoons Fe_2O_3 + H_2O$$

vacuoles are formed in the needles, of which the proportion by volume is calculated using the X-ray densities of the oxide hydroxides and the $\gamma$-$Fe_2O_3$ used.

| Oxide hydroxide Starting material | $\rho$X-ray g/cm$^3$ | Vacuoles in the $\gamma$-$Fe_2O_3$ % by volume |
|---|---|---|
| $\alpha$-FeOOH | 4.264 | 29.1 |
| $\beta$-FeOOH | 3.780 | 44.4 |
| $\gamma$-FeOOH | 3.950 | 38.6 |

$\gamma$-$Fe_2O_3$: $\rho$X-ray = 5.074 g/cm$^3$

The vacuole volume actually obtained in practice is frequently even higher than the theoretically calculated volume quoted above.

Accordingly, it would be of advantage, for improving numerous magnetic properties, to produce anisometric pigment particles of iron oxides optionally modified by foreign oxides which, like the acicular chromium dioxide crystallizing in the tetragonal rutile lattice, are completely filled with magnetic material.

It has now been found that iron oxides with a surprisingly low pore volume are obtained by hydrothermal conversion of the known oxide hydroxide starting materials.

Accordingly, the present invention relates to acicular to prismatic ferrimagnetic iron oxide pigments with a porosity of less than about 10 % by volume. The pore volume is preferably less than about 5% by volume.

The present invention also relates to acicular to prismatic ferrimagnetic iron oxide pigments with a pore volume of less than 10%, preferably less than 5%, which contain other metal oxides in concentration of up to about 15% by weight, e.g. about 1 to 5%.

The invention also relates to a process for producing these iron oxide pigments, wherein a suspension of iron (III) oxide hydroxides optionally modified by foreign metal hydroxides is heated in an autoclave to temperatures above about 100° C. in the presence of mono-, di- or tri-saccharides and alkali metal or alkaline earth metal hydroxide or carbonate and also in the presence of excess water, the pigments obtained are subsequently washed out, filtered and dried and are optionally oxidized carefully at temperatures of about 200° C. to 350° C.

The above-mentioned suspension may additionally contain linear polymeric laminators in concentrations of about 0.01 to 2% by weight.

In the context of the present invention, an autoclave is an excess-pressure vessel in which the vapor pressure of the water corresponding to the temperature prevailing therein can develop. In the case of batch-type operation, this excess-pressure vessel may be in the form of a closed vessel or, for continuous operation, may be in the form of, for example, a pressure tube into which the suspension is continuously introduced through a suitable pump and, after passing through a heating zone, is continuously run off through a pressure valve.

The iron oxide hydroxides $\alpha$-FeOOH, $\beta$-FeOOH or $\gamma$-FeOOH may be used as starting materials for the purposes of the invention. They may contain the above-mentioned foreign metal oxides and hydroxides or may be modified with them by subsequent precipitation.

α-FeOOH may be produced in the acidic pH-range, for example in accordance with British Pat. No. 1,221,434, in the alkaline pH-range, even with additional incorporation of $Zn^{2+}$ and $Co^{2+}$ ions, in accordance with U.S. Pat. No. 2,558,304 or U.S. Pat. No. 3,912,646; β-FeOOH may be produced in the acidic pH range in accordance with German Offenlegungsschrift No. 2,215,128 or British Pat. No. 1,041,520, and γ-FeOOH may be produced in accordance with U.S. Pat. No. 3,082,067 or in the presence of $Zn^{2+}$ ions in accordance with German Auslegeschrift No. 1,300,861. The precipitation of $CO(OH)_2$ onto acicular α-, β- or γ-FeOOH may be carried out in accordance with the teaching of British Pat. No. 1,318,579. By varying the process conditions (e.g. concentration, degree of precipitation, temperature, oxidation rate, choice of anions, control of the seed-forming and pigment-forming process, the relative quantity of seed used for pigment formation and the presence of foreign ions, etc.), it is possible systematically to modify particle size, particle form and the content of foreign ions in addition to the iron ions in the required manner.

Modified iron oxide hydroxides obtained by co-precipitation with $Zn^{2+}$ or $Co^{2+}$ ions are preferably used.

Suitable saccharides for producing the iron oxide magnetic pigments in accordance with the invention are the pentoses (for example arabinose, xylose and ribose) and hexoses (for example glucose, fructose, galactose and mannose) belonging to the class of monosaccharides, and cane sugar, lactose, maltose and raffinose belonging to the class of disaccharides and trisaccharides.

The saccharides are preferably present in the reaction mixture in quantities of about 0.5 to 5 parts by weight of saccharide per part by weight of FeOOH.

The presence of linear polymeric laminators in the reaction mixture further improves the magnetic properties of the iron oxide magnetic pigments according to the invention. According to British Pat. No. 1,232,051, laminators are at least partly water-soluble, linear, organic high molecular weight polymers with a degree of polymerization of about $10^4$ to $10^6$, the length of the chain molecules ranging from about 0.01 to 1 micrometer. Laminators are capable of stabilizing emulsions in very low concentrations of about 0.01 to 2% by weight. A variety of different substances may be used as laminators, for example polyethylene oxide, polyvinyl alcohol, polyacrylic acid, polyacrylamide, carboxymethyl cellulose, hydroxethyl cellulose, methyl cellulose, salts of styrene-maleic acid copolymers and lignin sulphonates, etc. The laminators are used in low concentration according to their effectiveness, i.e. in quantities of about 0.01 to 2% by weight, based on the reaction mixture. Polyvinyl alcohol or Fe-lignin sulphonate is preferably used.

The reaction mixture containing oxide hydroxides, saccharides, alkali metal or alkaline earth metal hydroxides and, optionally, laminators is heated in the autoclave preferably to temperatures above about 200° C. and, with particular preference, to temperatures of about 250° to 500° C. and is kept at that temperature for between 10 minutes and 5 hours and preferably for about 2 hours.

The invention is illustrated but by no means limited in its generallity by the following examples.

EXAMPLES 500 ml of an aqueous suspension containing 20 g of FeOOH were mixed while stirring at room temperature with 15 g of glucose, 18 ml of a 4.75 N NaOH-solution and, optionally, a laminator. The resulting suspension was poured into a stainless-steel vessel which was then heated in a 5 liter autoclave on a tripod over water and kept for 2 hours at an elevated temperature. After cooling, the iron oxide suspension obtained, optionally modified by foreign metal oxide, was washed, filtered and the filter residue was dried at 100° to 110° C. The magnetic values of remanence and coercive force were measured in the usual way on the powder obtained. The special data of the individual examples are set out in the following Table wherein the columns have the following significance:

Column 1: The number of the example.
Column 2: The type of iron oxide hydroxide used. (s) signifies an acid production process and (alk) an alkali production process.
Column 3: The content of foreign metal oxide. The foreign metal oxide may be present in the oxide hydroxide as a result of co-precipitation (Examples 7 to 10 and 15 to 17) or may be precipitated as hydroxide onto already precipitated iron oxide hydroxide (Examples 11 to 14).
Column 4: The crystallite size, as determined by X-ray methods, in the iron(III) oxide hydroxide starting materials.
Column 5: Type and quantity of laminator used.
Column 6: The autoclave temperature.
Columns 7 and 8: The values for remanence and coercive force measured on the iron oxide magnetic powder.

The pore volume of the iron oxide magnetic pigments obtained was assessed from electronmicroscopic photographs. A pore volume of less than 10% of the pigment volume was obtained in every example.

Acicular, ferrimagnetic, cubically crystallizing iron oxides of spinel structure, optionally modified by foreign metal oxides, of which the magnetic properties are at the peak of hitherto used iron oxide magnetic pigments, are obtained from the acicular non-ferrimagnetic oxide hydroxides by the autoclave treatment under the conditions according to the present invention. For the cobalt-containing iron oxides according to the invention, obtained by the conversion of α-(Fe, Co)OOH produced by an alkaline process, the coercive forces obtained are higher than those hitherto obtained in the prior art for the same cobalt content.

Example 15 was carried out under otherwise the same conditions with exchange of NaOH for KOH and also with exchange of glucose for corresponding quantities of ribose, lactose and galactose, corresponding magnetic values being obtained.

The dispersibility of the pigments according to the invention has proved to be particularly favorable, enabling the dispersion time in conventional disperson media to be shortened by around 40%.

By virtue of the process according to the invention, it is possible in a single reaction step, without any need to use explosive gases, such as $H_2$ or CO, to obtain highly reproducible acicular to prismatic, substantially vacuolefree ferrimagnetic oxide magnetic pigments completely or predominantly containing iron oxide which, especially in the case of pigments also containing cobalt oxide, also show high temperature stability of remanence and which may be used for a wise variety of magnetic recording applications.

| Example No. | Oxide hydroxide used | Foreign oxide mole % | | Crystalline size A | Laminator g/l | Autoclave temperature °C | Magnetic values of powder | |
|---|---|---|---|---|---|---|---|---|
| | | | | | | | $B_r/\rho$ G.g$^{-1}$cm$^3$ | $I_{HC}$ Oe |
| 1 | α-FeOOH (s.) | — | | 420 | — | 300 | 422 | 284 |
| 2 | α-FeOOH (s.) | — | | 290 | 0.8 Fe-lignin sulphonate | 300 | 414 | 313 |
| 3 | α-FeOOH (s.) | — | | 165 | — | 275 | 446 | 303 |
| 4 | α-FeOOH (s.) | — | | 165 | 0.05 polyvinyl alcohol | 285 | 452 | 315 |
| 5+) | α-FeOOH (s.) | — | | 165 | — | 275 | 446 | 301 |
| 6 | α-FeOOH (alk.) | — | | 165 | — | 290 | 456 | 374 |
| 7 | α-(Fe,Zn) OOH (s.) | 2 | ZnO | 115 | — | 270 | 467 | 327 |
| 8 | α-(Fe,Zn) OOH (s.) | 2 | ZnO | 115 | 0.8 Fe-lignin sulphonate | 270 | 510 | 348 |
| 9 | α-(Fe,Zn) OOH (s.) | 5 | ZnO | 90 | — | 280 | 492 | 335 |
| 10 | α-(Fe,Zn) OOH (s.) | 5 | ZnO | 90 | 0.8 Fe-lignin sulphonate | 280 | 509 | 350 |
| 11 | α-FeOOH (s.) | 0.5 | CoO++) | 165 | — | 275 | 464 | 387 |
| 12 | α-FeOOH (s.) | 1 | CoO++) | 165 | — | 275 | 451 | 472 |
| 13 | α-FeOOH (s.) | 2 | CoO++) | 165 | — | 275 | 469 | 583 |
| 14 | α-FeOOH (s.) | 2.44 | CoO+) | 165 | — | 275 | 461 | 650 |
| 15 | α-(Fe,Co) OOH (alk.) | 1 | CoO | 200 | — | 300 | 442 | 542 |
| 16 | α-(Fe,Co) OOH (alk.) | 2 | CoO | 175 | — | 300 | 456 | 638 |
| 17 | α-(Fe,Co) OOH (alk.) | 3 | CoO | 125 | — | 300 | 478 | 798 |
| 18 | γ-FeOOH (Cl$_2$$^-$) | — | | 85 | — | 290 | 435 | 249 |
| 19 | γ-FeOOH (SO$_4$$^-$) | — | | 95 | — | 280 | 424 | 292 |

+)LiOH instead of NaOH
++)precipitated as Co(OH)$_2$ onto - FeOOH

It will be appreciated that the instant specification and examples are set forth by way of illustration and not limitation, and that various modifications and changes may be made without departing from the spirit and scope of the present invention.

What is claimed is:

1. Acicular ferrimagnetic iron oxide pigment particles with a porosity of less than about 10% by volume and of cubic spinel structure.

2. An iron oxide pigment as claimed in claim 1, with a porosity of less than about 5% by volume.

3. An iron oxide pigment as claimed in claim 1, which, in addition to iron oxide, contains at least one other metal oxide in a concentration of up to about 15% by weight.

4. An iron oxide pigment as claimed in claim 3, containing about 1 to 10% by weight of cobalt oxide.

5. A process for producing an iron oxide pigment as claimed in claim 1, comprising heating a suspension of iron(III)oxide hydroxide in an autoclave to a temperature above about 100° C. in the presence of at least one mono-, di- or tri-saccharide, at least one alkali metal or alkaline earth metal hydroxide or carbonate and excess water, and washing, filtering and drying the resulting pigments.

6. A process as claimed in claim 5, wherein the iron-(III)oxide hydroxide is an α-(Fe,Co)OOH or α-(Fe,Zn)OOH obtained by acid or alkaline co-precipitation.

7. A process as claimed in claim 5, wherein the saccharide is at least one of arabinose, xylose, ribose, glucose, galactose, mannose and fructose.

8. A process as claimed in claim 5, wherein the saccharide is at least one of cane sugar, lactose, maltose and raffinose.

9. A process as claimed in claim 5, wherein the suspension additionally contains about 0.01 to 2% by weight of at least one laminator.

10. A process as claimed in claim 9, wherein the laminator is at least one of polyvinyl alcohol and lignin sulphonate.

11. A process as claimed in claim 5, wherein the mixture is heated in the autoclave to a temperature above about 200° C.

12. A process as claimed in claim 5, including the further step of oxidizing the pigment at a temperature of from about 250° to 350° C.

13. A process as claimed in claim 12, wherein the iron(III)oxide hydroxide is an α-(Fe,CO)OOH or α-(Fe,Zn)OOH obtained by acid or alkaline co-precipitation, the saccharide is at least one of arabinose, xylose, ribose, glucose, galactose, mannose, fructose, cane sugar, lactose, maltose and raffinose, the suspension additionally contains about 0.01 to 2% by weight of at least one of polyvinyl alcohol and lignin sulphonate, and the mixture is heated in the autoclave to a temperature of from about 250° to 500° C.

* * * * *